United States Patent
Wu et al.

(10) Patent No.: US 12,366,749 B2
(45) Date of Patent: Jul. 22, 2025

(54) HEAD-UP DISPLAY SYSTEM, DISPLAY APPARATUS AND DRIVING APPARATUS

(71) Applicants: Beijing BOE Optoelectronics Technology Co., Ltd., Beijing (CN); BOE Technology Group Co., Ltd., Beijing (CN)

(72) Inventors: Yulong Wu, Beijing (CN); Chenru Wang, Beijing (CN); Ruijun Dong, Beijing (CN); Ke Li, Beijing (CN); Na Han, Beijing (CN); Jiarong Bai, Beijing (CN); Haitao Huang, Beijing (CN); Zhanshan Ma, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/796,370

(22) PCT Filed: Aug. 27, 2021

(86) PCT No.: PCT/CN2021/115046
§ 371 (c)(1),
(2) Date: Jul. 29, 2022

(87) PCT Pub. No.: WO2023/024080
PCT Pub. Date: Mar. 2, 2023

(65) Prior Publication Data
US 2024/0184106 A1    Jun. 6, 2024

(51) Int. Cl.
*G02B 27/01* (2006.01)

(52) U.S. Cl.
CPC .. *G02B 27/0101* (2013.01); *G02B 2027/0196* (2013.01)

(58) Field of Classification Search
CPC ... G02B 27/01–0189; G02B 2027/0105–0198; B60K 35/00–90; B60K 2360/00–96
See application file for complete search history.

(56) References Cited

U.S. PATENT DOCUMENTS

2009/0153962 A1    6/2009   Okada et al.
2016/0091716 A1*   3/2016   Larson ................ G02B 5/3041
                                                              359/631
(Continued)

FOREIGN PATENT DOCUMENTS

CN    108535867 A    9/2018
CN    111948812 A    11/2020
(Continued)

*Primary Examiner* — Christopher A Lamb, II
(74) *Attorney, Agent, or Firm* — IPro, PLLC (57) ABSTRACT

A head-up display system and a display apparatus are provided in this disclosure, which relates to a technical field of displaying. The head-up display system includes a display unit; a light splitting unit provided on a light emitting side of the display unit and configured to transmit a first linearly polarized light and block a second linearly polarized light, light emitted by the display unit being converted into the first linearly polarized light after passing through the light splitting unit; a light-transmitting substrate; a first imaging unit provided on an optical path from the light splitting unit to the light-transmitting substrate and configured to be able to transmit and reflect the first linearly polarized light; and a second imaging unit provided on a side of the light-transmitting substrate away from the first imaging unit, and configured to reflect the first linearly polarized light transmitted through the light-transmitting substrate.

17 Claims, 3 Drawing Sheets

(56) References Cited

U.S. PATENT DOCUMENTS

2022/0214542 A1    7/2022  Fang et al.
2022/0388396 A1*  12/2022  Hirata .................. B60K 35/234
2024/0025156 A1*   1/2024  Jiang .................. G02B 27/0101

FOREIGN PATENT DOCUMENTS

CN       113071165 A    7/2021
JP       2009128658 A   6/2009

* cited by examiner

HEAD-UP DISPLAY SYSTEM, DISPLAY APPARATUS AND DRIVING APPARATUS

TECHNICAL FIELD

The disclosure relates to the technical field of displaying, and more particularly, to a head-up display system, a display apparatus and a driving apparatus.

BACKGROUND

With rapid development of display technologies, a Head Up Display (Hud) system is increasingly applied in automobiles. An on-board head-up display system is capable of projecting important traveling information such as navigation and a traveling speed onto a windscreen in front of a driver, so that the driver is able to see the traveling information without lowering his head, thus avoiding distracting attention to a road ahead.

However, in the related art, due to transmission effect of the windscreen on display light, brightness of an image projected on the windscreen is low, which reduces display effect of the head-up display system.

SUMMARY

Embodiments of the disclosure incorporate following technical schemes.

In an aspect, a head-up display system is provided in an embodiment of the present disclosure, which includes a display unit, a light splitting unit, a light-transmitting substrate, a first imaging unit and a second imaging unit.

The light splitting unit is disposed on a light emitting side of the display unit and configured to transmit a first linearly polarized light and block a second linearly polarized light. Light emitted by the display unit is converted into the first linearly polarized light after passing through the light splitting unit.

The first imaging unit is disposed on an optical path from the light splitting unit to the light-transmitting substrate and configured to be able to transmit and reflect the first linearly polarized light.

The second imaging unit is disposed on a side of the light-transmitting substrate away from the first imaging unit, and is configured to reflect the first linearly polarized light transmitted through the light-transmitting substrate.

In some embodiments, the first imaging unit includes a transflective film disposed on an optical path from the light splitting unit to the light-transmitting substrate. The transflective film is configured to reflect a part of the first linearly polarized light and transmit a remaining part of the first linearly polarized light.

In some embodiments, the second imaging unit includes a first reflective polarizer disposed on a side of the light-transmitting substrate away from the first imaging unit and configured to reflect the first linearly polarized light transmitted through the light-transmitting substrate.

In some embodiments, the second imaging unit includes a second reflective polarizer and a phase retarder. The second reflective polarizer is disposed on a side of the light-transmitting substrate away from the first imaging unit, and the phase retarder is disposed between the light-transmitting substrate and the second reflective polarizer.

The phase retarder is configured to convert the first linearly polarized light into the second linearly polarized light on an optical path from the light-transmitting substrate to the second reflective polarizer; and to convert the second linearly polarized light into the first linearly polarized light on an optical path from the second reflective polarizer to the light-transmitting substrate.

In some embodiments, the first imaging unit comprises a transflective film provided on an optical path from the light splitting unit to the light-transmitting substrate, the transflective film being configured to reflect part of the first linearly polarized light and transmit a remaining part of the first linearly polarized light.

In some embodiments, the second imaging unit comprises a first reflective polarizer disposed on a side of the light-transmitting substrate away from the first imaging unit and configured to reflect the first linearly polarized light transmitted through the light-transmitting substrate.

In some embodiments, the second imaging unit comprises a second reflective polarizer and a phase retarder, the second reflective polarizer being disposed on a side of the light-transmitting substrate away from the first imaging unit, and the phase retarder being disposed between the light-transmitting substrate and the second reflective polarizer; wherein the phase retarder is configured to convert the first linearly polarized light into the second linearly polarized light on an optical path from the light-transmitting substrate to the second reflective polarizer; and to convert the second linearly polarized light into the first linearly polarized light on an optical path from the second reflective polarizer to the light-transmitting substrate; and the second reflective polarizer is configured to reflect the second linearly polarized light emitted from the phase retarder.

In some embodiments, the phase retarder comprises a half-wave plate.

In some embodiments, the phase retarder comprises a half-wave plate and a phase retardation compensation film.

In some embodiments, the light-transmitting substrate comprises an interlayer; wherein the interlayer is configured to be capable of changing a propagation path of lights from a first surface of the light-transmitting substrate to a second surface of the light-transmitting substrate so as to reduce reflection of the second surface, and further changing a propagation path from the second surface to the first surface to cause reflected lights of the first imaging unit and reflected lights of the second imaging unit to be radiated into a human eye along a same path; and the first surface is a surface of the light-transmitting substrate away from the second imaging unit, and the second surface is a surface of the light-transmitting substrate away from the first imaging unit.

In some embodiments, a cross-sectional shape of the interlayer in a direction perpendicular to the light-transmitting substrate comprises a wedge shape.

In some embodiments, the head-up display system further comprises a light-transmitting protective film, the light-transmitting protective film being located on a side of the second imaging unit away from the light-transmitting substrate.

In some embodiments, the second imaging unit is further configured to convert ambient light into the second linearly polarized light in an optical path direction of the ambient light impinging on the light-transmitting substrate.

In some embodiments, the second imaging unit comprises a second reflective polarizer and a phase retarder, the second reflective polarizer being further configured to convert the ambient light into the first linearly polarized light and the phase retarder being further configured to convert the first linearly polarized light into the second linearly polarized light.

In some embodiments, the first linearly polarized light is a P polarized light and the second linearly polarized light is an S polarized light; or, the first linearly polarized light is the S polarized light, and the second linearly polarized light is the P polarized light.

In some embodiments, the display unit comprises one of an organic light emitting diode display screen, a micro display screen, a liquid crystal display screen, a digital light processing display screen and an LCOS display screen.

A display apparatus including the head-up display system as described above is provided in an embodiment of the present disclosure.

A driving apparatus including the display apparatus as described above is further provided in an embodiment of the disclosure.

In some embodiments, the light-transmitting substrate in the display apparatus includes a windscreen.

The above description is only a summary of the technical scheme of this disclosure, which may be implemented according to the contents of the description in order to understand the technical means of this disclosure more clearly. In order to make the above and other objects, features and advantages of this disclosure more obvious and understandable, the following is a specific embodiment of this disclosure.

BRIEF DESCRIPTION OF THE DRAWINGS

In order to explain the embodiments of the present disclosure or the technical scheme in the related art more clearly, the drawings required in the description of the embodiments or the prior art will be briefly introduced below; obviously, the drawings in the following description are only some embodiments of the present disclosure, and other drawings may be obtained according to these drawings by those of ordinary skill in the art without paying creative labor.

DETAILED DESCRIPTION OF THE EMBODIMENTS

In the following, the technical scheme in the embodiment of the disclosure will be described clearly and completely in connection with the drawings; obviously, the described embodiment is intended to be only a part of the embodiment of the disclosure, but not all of them. On a basis of the embodiments in this disclosure, all other embodiments obtained by the ordinary skilled in the art without any creative effort should be within a protection scope of this disclosure.

Unless the context requires otherwise, a term "including" is constructed as an open and inclusive meaning, that is, "including, but not limited to" throughout the specification and claims. In description of the specification, terms "one embodiment", "some embodiments", "an exemplary embodiment", "an example", "a specific example" or "some examples" are intended to indicate that a specific feature, structure, material or characteristic related to this embodiment or example is included in at least one of embodiments or examples of this disclosure. Schematic representations of the above terms do not necessarily refer to a same embodiment or example. Furthermore, the specific features, structures, materials or characteristics described may be included in any one or more of the embodiments or examples in any suitable way.

In embodiments of this disclosure, words "first" and "second" are used to distinguish the same items or similar items with substantially same functions and purposes, only to clearly describe technical schemes of the embodiments of this disclosure, but cannot be understood as indicating or implying relative importance or implicitly indicating a number of indicated technical features.

A Head-up display, also called a parallel display system, is mostly used in automobiles and airplanes. In the related art, the HUD may be classified into at least three types according to its optical principle, including a Combiner-Hud, a Windscreen-Hud and an AR-Hud. The Windscreen-Hud (Windscreen Head-up Display) is mainly used to project important driving information such as speed and navigation on the windscreen in front of the driver, so that the driver may see the important driving information such as the speed and navigation as far as possible without lowering or turning his head. Specifically, the main principle of the windscreen head-up display is as follows: important information such as driving information or flight information is projected on a windscreen in front of the driver. When the driver looks forward through the windscreen, he may integrate a scene of the external environment with displayed content projected by the head-up display. Because the displayed content projected by the head-up display may be adjusted at a position infinitely far away from a focal length of a human eye, discomfort caused by constant adjustment of the focal length of the human eye may be avoided when the driver views the scene of the external environment and the displayed content projected by the head-up display.

However, due to the transmission effect of the windscreen on display light, the brightness of an image projected on the windscreen is low, which reduces the display effect of the head-up display system.

Figure 1:
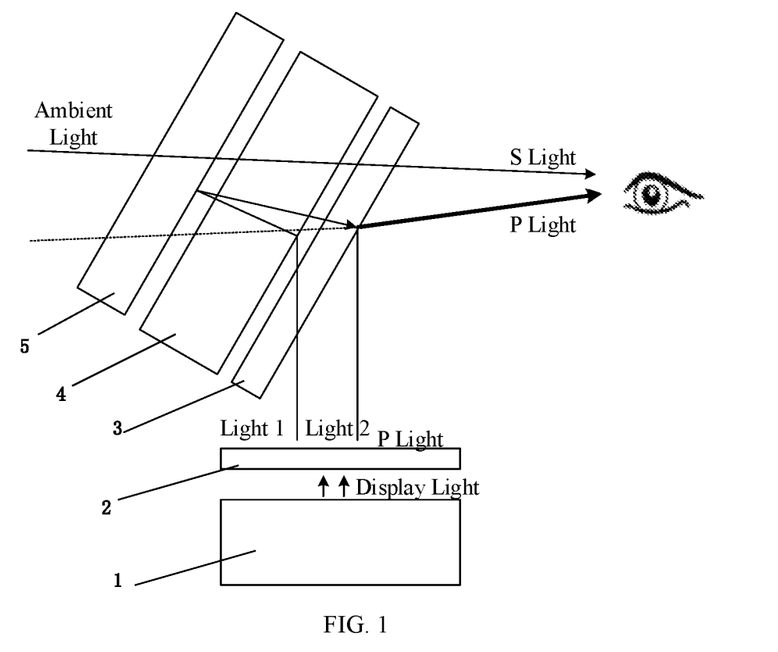
FIG. 1, FIG. 2a, FIG. 2b and FIG. 3 are structural schematic diagrams of four types of Head-up display systems according to embodiments of this disclosure, respectively.

On this basis, a head-up display system is provided in an embodiment of the present disclosure, which, as shown in FIG. 1, includes a display unit 1, a light splitting unit 2, a light-transmitting substrate 4, a first imaging unit 3 and a second imaging unit 5.

The display unit 1 may include a display screen, a type of which is not limited herein. For example, the display screen may be any one of a Liquid Crystal Display (LCD) display screen, an Organic Light-Emitting Diode (OLED) display screen, a Micro OLED micro display screen, and a Mini LED micro display screen; or may be a Digital Light Processing (DLP) display screen; or may be a Liquid Crystal on Silicon (LCOS) display screen. In addition, the display screen may be a flexible screen or a rigid screen (i.e., a non-flexible screen). In a practical application, it may be selected according to users' needs.

The light splitting unit 2 is disposed on a light emitting side of the display unit 1 and configured to transmit a first linearly polarized light and block a second linearly polarized light. Light emitted by the display unit 1 is converted into the first linearly polarized light after passing through the light splitting unit.

The light emitting side of the display unit 1 refers to a side where the display unit 1 emits the display light, that is, a display side. In addition, the polarization vectors of the first linearly polarized light and the second linearly polarized light are different. For example, the first linearly polarized light is a P polarized light (P light for short), and the second linearly polarized light is an S polarized light (S light for short). Certainly, the first linearly polarized light may also be an S polarized light, and the second linearly polarized light may also be a P polarized light. Practically, the former is chosen in most of the cases.

The first linearly polarized light being the P polarized light (P light for short) and the second linearly polarized light being the S polarized light (S light for short) are taken as examples in embodiments of this disclosure.

When light passes through a surface of an optical element (such as a beam splitter) at a non-vertical angle, both reflection and transmission characteristics performing depend on the polarization phenomenon. In this case, the used coordinate system is defined by a plane containing the incident and reflected beams. If a polarization vector of light is in this plane, it is called the P-polarized light, and if the polarization vector is perpendicular to this plane, it is called the S-polarized light.

A way that the light splitting unit 2 blocks the second linearly polarized light is not limited in the embodiments of this disclosure. For example, blocking of the light may be made in reflective or absorptive manner.

A specific structure of the light splitting unit 2 is not limited in the embodiments of this disclosure, and any structure that may transmit the first linearly polarized light and block the second linearly polarized light is encompassed in the embodiments of this disclosure. For example, the light splitting unit 2 may be a polarizing plate, or it may be a polarizing transflective film. The polarizing plate or polarizing transflective film may transmit the S light and block the P light, or the polarizing plate or polarizing transflective film may transmit the P light and block the S light.

A specific structure of the light-transmitting substrate 4 is not limited in the embodiments of the present disclosure. For example, the light-transmitting substrate may be flat glass or curved glass.

In a practical application, when the head-up display system is applied to different scenes, the structure of the light-transmitting substrate 4 may be different.

For example, if the head-up display system is applied to a cockpit of an automobile, an airplane or other vehicles, the light-transmitting substrate 4 may be a front windscreen, and the structure of the light-transmitting substrate 4 may be determined according to the structural design of the windscreen in an actual vehicle. If the head-up display system is applied to a window, such as a building window or a vehicle window, the light-transmitting substrate 4 may be glass on the window. Certainly, in the practical application, the head-up display system may also be applied to other different scenarios, which may be determined according to actual needs, and the specific structure of the light-transmitting substrate 4 may be adjusted according to actual requirements.

The first imaging unit 3 is disposed on an optical path from the light splitting unit 2 to the light-transmitting substrate 4 and configured to be able to transmit or reflect the first linearly polarized light.

The second imaging unit 5 is disposed on a side of the light-transmitting substrate 4 away from the first imaging unit 3, and is configured to be able to reflect the first linearly polarized light transmitted through the light-transmitting substrate.

Specific structures of the first imaging unit 3 and the second imaging unit 5 are not limited in the embodiments of the present disclosure.

In an exemplary embodiment, the first imaging unit 3 may include a transflective film.

In an exemplary embodiment, the second imaging unit 5 may include a reflective polarizer PBS.

In an exemplary embodiment, after the light splitting unit 2 converts the display light into the P light and emits it (in a case where the first linearly polarized light is the P light), a first part of the P light is reflected to a human eye through the first imaging unit 3; a remaining part of the P light passes through the first imaging unit 3, then through the light-transmitting substrate 4, and onto a surface of the second imaging unit 5. The second imaging unit 5 then reflects out this P light, which is emitted through the light-transmitting substrate 4 and the first imaging unit 3 in turn, and then is radiated into the human eye together with the first part of the P light. It should be noted that in a practical application, the structure of the light-transmitting substrate 4 may be adjusted to cause the remaining part of the P light radiated into the human eye to be radiated into the human eye along the same path as the first part of the P light radiated into the human eye, so as to avoid a ghosting problem and improve the display effect.

In an exemplary embodiment, after the light splitting unit 2 converts the display light into the S light and emits it (in a case where the first linearly polarized light is the S light), a first part of the S light is reflected to the human eye through the first imaging unit 3; a remaining part of the S light passes through the first imaging unit 3, then through the light-transmitting substrate 4, and onto the surface of the second imaging unit 5. The second imaging unit 5 then reflects out this S light, which is emitted through the light-transmitting substrate 4 and the first imaging unit 3 in turn, and then is radiated into the human eye together with the first part of the S light. It should be noted that in a practical application, the structure of the light-transmitting substrate 4 may be adjusted to cause the remaining part of the S light radiated into the human eye to be radiated into the human eye along the same path as the first part of the S light radiated into the human eye, so as to avoid a ghosting problem and improve the display effect.

The head-up display system is provided in the embodiment of the disclosure, which includes the display unit 1, the light splitting unit 2, the light-transmitting substrate 4, the first imaging unit 3 and the second imaging unit 5. The light splitting unit 2 is disposed on the light emitting side of the display unit 1 and configured to transmit the first linearly polarized light and block the second linearly polarized light. The light emitted by the display unit 1 is converted into the first linearly polarized light after passing through the light splitting unit 2. The first imaging unit 3 is disposed on the optical path from the light splitting unit 2 to the light-transmitting substrate 4 and configured to be able to transmit or reflect the first linearly polarized light. The second imaging unit 5 is disposed on the side of the light-transmitting substrate 4 away from the first imaging unit 3, and is configured to be able to reflect the first linearly polarized light transmitted through the light-transmitting substrate 4.

In the head-up display system, as much of the display light may be reflected to the human eye through joint action of the first imaging unit 3 and the second imaging unit 5. On one hand, the light utilization rate of the head-up display system is improved and the energy consumption is reduced. On the other hand, the brightness of a displayed image projected on the light-transmitting substrate 4 and the display effect are improved, which further facilitates the watching of the user. On the other hand, with the brightness of the displayed image projected on the light-transmitting substrate 4 being improved, the contrast between the displayed image on the light-transmitting substrate 4 and the scene of the external environment may be improved, and thus a problem that content of the displayed image and the scene of the external environment are fused together and are difficult to be identified may be avoided.

Figure 2A:
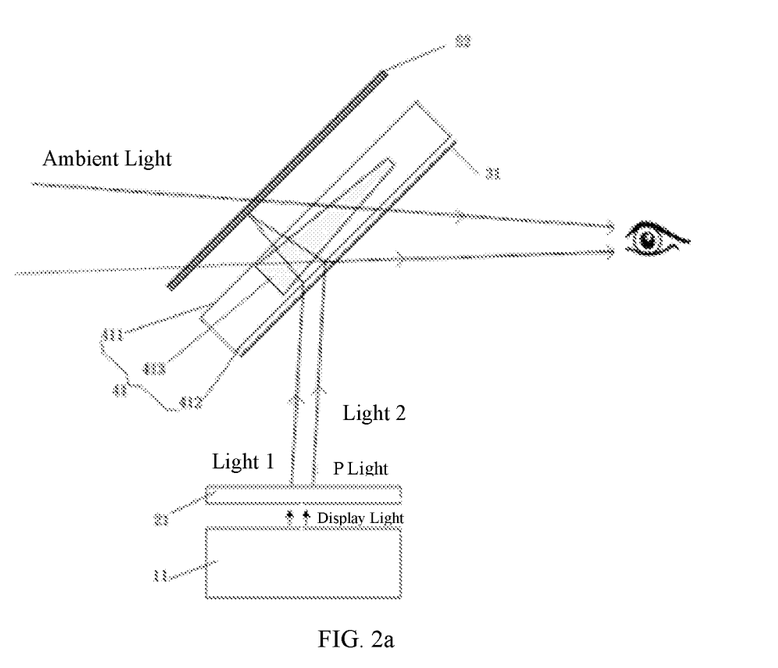

In some embodiments, as shown in FIG. 2a, the first imaging unit 3 includes a transflective film 31 disposed on an optical path from the light splitting unit 2 to the light-transmitting substrate 4. The transflective film 31 is configured to reflect part of the first linearly polarized light and transmit the remaining part of the first linearly polarized light.

In an exemplary embodiment, transmittance and reflectance of the transflective film 31 to light may be 50%: 50%, or 30%: 70, or 40%: 60%. Certainly, it may also be other values, which may be determined according to actual situations.

In a practical application, after the display light is converted into the first linearly polarized light by the light splitting unit 2, the first linearly polarized light is radiated onto a surface of the transflective film 31, with a part of the first linearly polarized light being reflected by the transflective film 31 and then radiated into the human eye and a remaining part of the first linearly polarized light being radiated onto the light-transmitting substrate 41 through the transflective film 31. Because the transflective film 31 is usually deposited on a first surface 412 of the light-transmitting substrate 4 (the windscreen 41), under the action of the transflective film 31, the reflection of the light on the first surface 412 of the light-transmitting substrate 4 is very weak and usually negligible.

In some embodiments, as shown in FIG. 2a, the second imaging unit 5 includes a first reflective polarizer 52 disposed on a side of the light-transmitting substrate 4 away from the first imaging unit 3 and configured to reflect the first linearly polarized light transmitted through the light-transmitting substrate 4.

In a practical application, when the first linearly polarized light transmitted through the transflective film 31 is radiated onto the first reflective polarizer 52 through the light-transmitting substrate 4, the first reflective polarizer 52 reflects the first linearly polarized light back into the light-transmitting substrate 4, and then emits it through the transflective film 31, and the first linearly polarized light emitted from the transflective film 31 is radiated into the human eye again, therefore, more display lights projected on the light-transmitting substrate 4 are radiated into the human eye and the brightness of the displayed image projected on the light-transmitting substrate 4 may be improved.

It should be noted that the first reflective polarizer 52 is usually also deposited on a surface of the light-transmitting substrate 4 away from the transflective film 31. Therefore, when the light (first linearly polarized light) is reflected back into the light-transmitting substrate 4 from the first reflective polarizer 52, an interface between the light-transmitting substrate 4 and the first reflective polarizer 52 has very little influence on an optical path, which may be neglected.

Figure 2B:
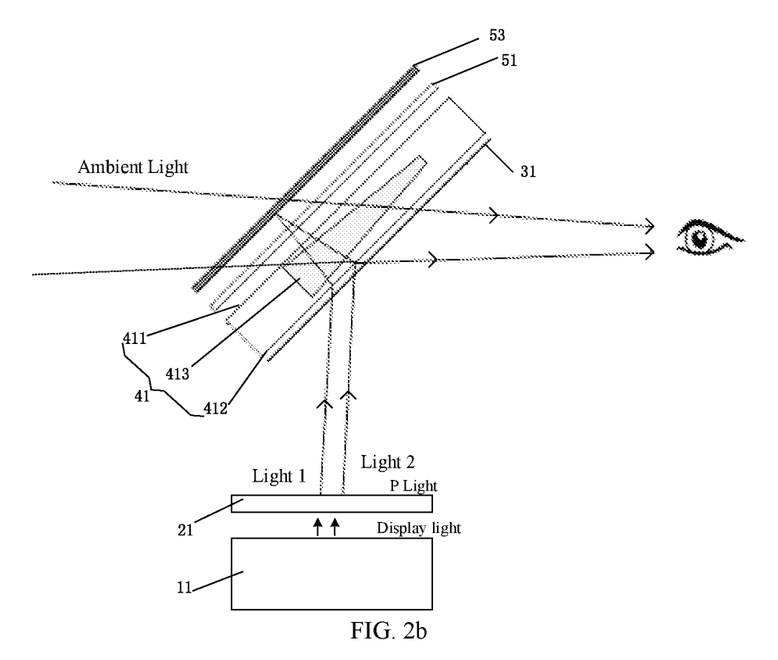

In some embodiments, as shown in FIG. 2b, the second imaging unit 5 includes a second reflection polarizer 53 and a phase retarder 51. The second reflection polarizer 53 is disposed on a side of the light-transmitting substrate 4 away from the first imaging unit 3, and the phase retarder 51 is disposed between the light-transmitting substrate 4 and the second reflection polarizer 53.

The phase retarder 51 is configured to convert the first linearly polarized light into the second linearly polarized light on an optical path from the light-transmitting substrate 4 to the second reflective polarizer 53; and to convert the second linearly polarized light into the first linearly polarized light on an optical path from the second reflective polarizer 53 to the light-transmitting substrate 4. The second reflective polarizer 53 is configured to reflect the second linearly polarized light emitted from the phase retarder 51.

In an exemplary embodiment, the materials of the first reflective polarizer 52 and the second reflective polarizer 53 are the same, for example, both materials are polymer materials.

In some embodiments, as shown in FIG. 2b, the second imaging unit 5 is further configured to convert ambient light into the second linearly polarized light in an optical path direction of the ambient light impinging on the light-transmitting substrate 4.

In an exemplary embodiment, the second reflective polarizer 53 is further configured to convert the ambient light into the first linearly polarized light, and the phase retarder 51 is further configured to convert the first linearly polarized light into the second linearly polarized light.

In a practical application, after the display light is converted into the first linearly polarized light through the light splitting unit 2, the first linearly polarized light is radiated onto the surface of the transflective film 31, with the first part of the first linearly polarized light being reflected by the transflective film 31 and into the human eye and the remaining part of the first linearly polarized light being radiated into the phase retarder 51 through the light-transmitting substrate 4 through the transflective film 31. The phase retarder 51 converts the first linearly polarized light into the second linearly polarized light and then emits it onto the second reflective polarizer 53. The second reflective polarizer 53 reflects the second linearly polarized light emitted from the phase retarder 51 back into the phase retarder 51, and the phase retarder 51 then converts the second linearly polarized light into the first linearly polarized light and radiates it into the light-transmitting substrate 4, which then is radiated into the human eye through the transflective film 31, therefore, more display lights projected on the light-transmitting substrate 4 are radiated into the human eye, the light utilization rate is improved and the power consumption of the display system is reduced. The brightness of the displayed image projected on the light-transmitting substrate 4 and thus the display effect may be improved.

In addition, ambient light outside the head-up display system may be radiated into the human eye through the second imaging unit 5, the light-transmitting substrate 4 and the first imaging unit 3 in turn.

In an exemplary embodiment, as shown in FIG. 2b, the ambient light is converted into the first linearly polarized light after passing through the second reflective polarizer 53, and the first linearly polarized light is converted into the second linearly polarized light after passing through the phase retarder 51, which is then radiated into the human eye after passing through the light-transmitting substrate 4 and the transflective film 31 in turn, together with the display light converted into the first linearly polarized light.

In an exemplary embodiment, the ambient light are converted into the P light after passing through the second reflective polarizer 53, and this P light is converted into the S light after passing through the phase retarder 51, which is then radiated into the human eye after passing through the light-transmitting substrate 4 and the transflective film 31 in turn, together with the display light converted into the P light.

In an exemplary embodiment, the display light may be converted into the P light and then reflected and radiated into the human eye, and the ambient light may be converted into the P light and then radiated into the human eye. Or, the display light may be converted into the S light and then reflected and radiated into the human eye, and the ambient light may be converted into the S light and then radiated into the human eye. Or, the display light may be converted into the P light and then reflected and radiated into the human eye, and the ambient light may be converted into the S light and then radiated into the human eye. Or, the display light may be converted into the S light and then reflected and radiated into the human eye, and the ambient light may be converted into the P light and then radiated into the human eye. It may be determined according to actual situations, and no limitation is made herein.

In this way, the user may view the scene of the external environment and the displayed image transmitted on the light-transmitting substrate 4 at the same time, thus improving the user experience. In addition, with the high brightness of the displayed image projected on the light-transmitting substrate 4, a certain contrast exists between the displayed image on the light-transmitting substrate 4 and the scene of the external environment, thus avoiding the problem that the content of the displayed image and the scene of the external environment are fused together and are difficult to be identified.

In some embodiments, the phase retarder 51 includes a half-wave plate.

The half-wave plate (also called a λ/2 wave plate or a half wave plate) refers to a birefringent crystal with a certain thickness. When normal incident light passes through the birefringent crystal, the phase difference between ordinary light and extraordinary light is equal to π or its odd multiple times. The half-wave plate may rotate polarized lights. When a linearly polarized light is vertically incident on the half-wave plate, the transmitted light is still a linearly polarized light. The P polarized light is converted into the S polarized light after passing through the half-wave plate. On the contrary, the S polarized light is converted into the P polarized light after passing through the half-wave plate.

In some embodiments, the phase retarder includes a half-wave plate and a phase retardation compensation film.

The phase retardation compensation film eliminates blue-violet lights and yellow-green lights on the display screen by compensating the difference in light transmission speeds, so that the black-white display may be more vivid.

In the embodiment of the present disclosure, by providing the phase retardation compensation film, the display effect of the display unit 1 may be improved, and further, the display effect of the head-up display system composed of the display unit 1 may be improved.

In some embodiments, the light-transmitting substrate 4 includes a windscreen 41.

In some embodiments, as shown in FIG. 2b, the light-transmitting substrate 4 (windscreen 41) includes an interlayer 413. The interlayer 413 is configured to be able to change an optical path from the first surface 412 of the light-transmitting substrate 4 (windscreen 41) to a second surface 411 of the light-transmitting substrate 4 (windscreen 41) so as to reduce reflection of the second surface 411, and further to change an optical path from the second surface to the first surface to cause reflected lights of the first imaging unit and reflected lights of the second imaging unit to be radiated into the human eye along the same path. The first surface 412 is a surface of the light-transmitting substrate away from the second imaging unit 5, and the second surface 411 is a surface of the light-transmitting substrate away from the first imaging unit 3.

In some embodiments, a cross-sectional shape of the interlayer 413 in a direction perpendicular to the light-transmitting substrate 4 includes a wedge shape.

Figure 3:
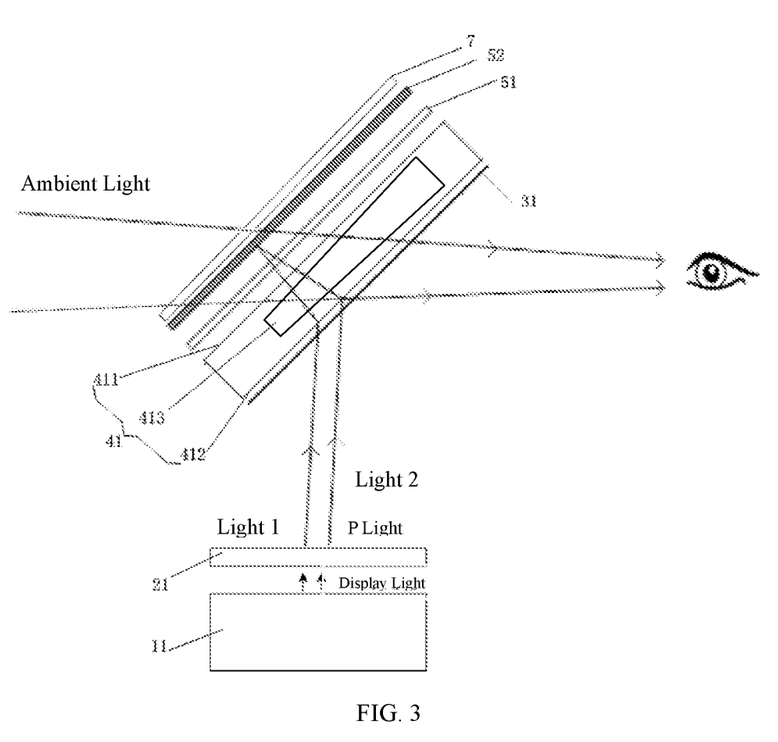

For example, a thickness of the interlayer 413 may be large at top and small at bottom as shown in FIG. 3, or may be small at top and small at bottom as shown in FIG. 2b, which may be determined according to actual situations.

For example, the thickness of the interlayer 413 may range from 1 mm to 5 mm.

For example, a material of the interlayer 413 may be a polymer light-transmitting material, or an inorganic oxide light-transmitting material, or glass.

In a practical application, after the display light is converted into the first linearly polarized light by the light splitting unit 2, the first linearly polarized light is radiated on the surface of the transflective film 31, with a first part of the first linearly polarized light being reflected by the transflective film 31 and into the human eye and a remaining part of the first linearly polarized light being radiated onto the transflective film 31. When the first linearly polarized light transmitted from the transflective film 31 passes through the first surface 412, the interlayer 413, the second surface 411 and the phase retarder 51, the phase retarder 51 converts this first linearly polarized light into the second linearly polarized light which is radiated onto the first reflective polarizer 52. The first reflective polarizer 52 reflects the second linearly polarized light and then converts it into the first linearly polarized light through the phase retarder 51. After this first linearly polarized light passes through the second surface 411 and the interlayer 413, the interlayer 413 changes the propagation path of this first linearly polarized light, so that the propagation path of this first linearly polarized light from the first surface 412 through the transflective film 31 and into the human eye is the same as that of the first part of the first linearly polarized light, thus avoiding the ghosting problem and improving the display effect.

Figure 4:
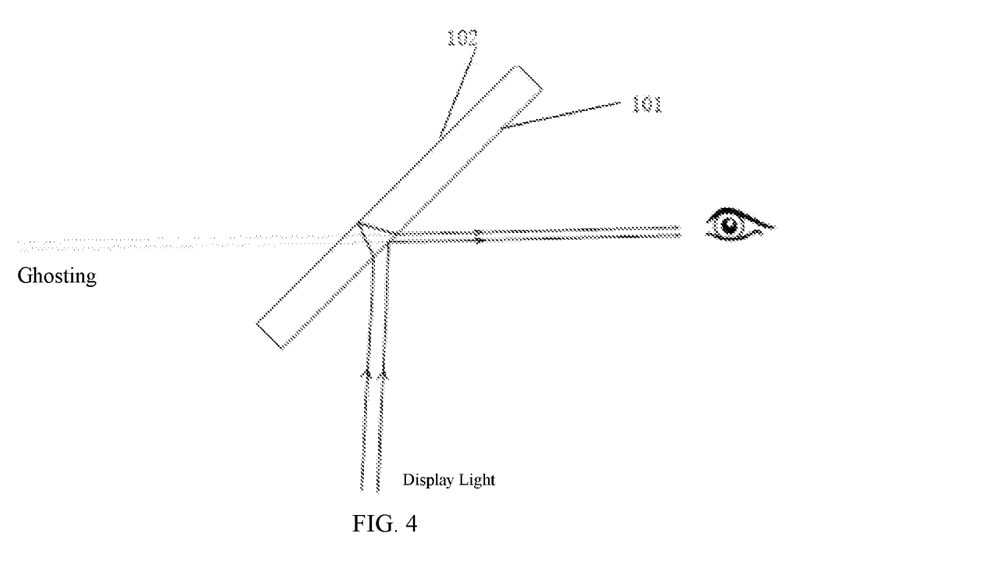
FIG. 4 is a structural schematic diagram of a head-up display system in the related art according to an embodiment of the present disclosure.

It should be noted that, in the related art, as shown in FIG. 4, when the display light is transmitted onto the windscreen, an inner surface 101 and an outer surface 102 of the windscreen reflect the display light, respectively, so that paths of two reflected beams radiated into the human eye are different, resulting in the ghosting problem. According to the embodiment of the disclosure, the interlayer 413 is disposed in the light-transmitting substrate 4, so that the propagation paths of the two reflected beams are effectively adjusted, thereby avoiding the ghosting problem and improving the display effect.

In some embodiments, as shown in FIG. 3, the head-up display system further includes a light-transmitting protective film 7, which is located on a side of the second imaging unit 5 away from the light-transmitting substrate 4.

For example, the light-transmitting protective film 7 may be a tempered film.

In some embodiments, in order to ensure that users may clearly view the scene of the external environment through the first imaging unit 3, the light-transmitting substrate 4 and the second imaging unit 5, it is required that transmittance of the first imaging unit 3, the light-transmitting substrate 4 and the second imaging unit 5 which are laminated should be greater than 50%, 70%, 75%, 80% or 85%, which may be specifically determined according to actual use scenarios, which is not limited herein.

For example, when the light-transmitting substrate 4 is a front windscreen of an automobile, the transmittance of the first imaging unit 3, the light-transmitting substrate 4 and the second imaging unit 5 which are laminated cannot be lower than 70%.

When the light-transmitting substrate 4 is a side windscreen or rear windscreen of an automobile, the transmittance of the first imaging unit 3, the light-transmitting substrate 4 and the second imaging unit 5 which are laminated cannot be lower than 50%.

In some embodiments, the first linearly polarized light is the P polarized light and the second linearly polarized light is the S polarized light. Or, the first linearly polarized light is the S polarized light and the second linearly polarized light is the P polarized light.

In some embodiments, the display unit includes one of an organic light emitting diode display screen, a micro display screen, a liquid crystal display screen, a digital light processing projection device and an LCOS display screen. In addition, the display screen may be a flexible screen or a rigid screen (i.e., a non-flexible screen). In a practical application, it may be selected according to users' demands.

A display apparatus including the head-up display system as described above is provided in an embodiment of the present disclosure.

In the display apparatus according to the embodiment of the present disclosure, as much display light as possible may be reflected to the human eye through joint action of the first imaging unit 3 and the second imaging unit 5. On one hand, the light utilization rate of the head-up display system is improved and the energy consumption is reduced. On the other hand, the brightness of the displayed image projected on the light-transmitting substrate 4 and the display effect are improved, which further facilitates the watching of the user. On the other hand, with the brightness of the displayed image projected on the light-transmitting substrate 4 being improved, the contrast between the displayed image on the light-transmitting substrate 4 and the scene of the external environment may be improved, and thus the problem that content of the displayed image and the scene of the external environment are fused together and are difficult to be identified may be avoided.

In addition, with the display apparatus, texts or images in the display unit may be projected at a distance infinitely far away from the focal length of the human eye, so that the user may easily fuse the scene of the external environment with the displayed image, and information delay and discomfort caused by constant adjustment of a focal length of user's human eye may be avoided. Certainly, a focal length for projecting texts or images in the display unit may also be adjusted according to actual design, which is not limited herein.

A driving apparatus including the display apparatus as described above is provided in an embodiment of the disclosure.

For example, the driving apparatus includes, but is not limited to, an automobile, an airplane, a ship, a train, a subway, a high-speed rail and the like.

In some embodiments, the light-transmitting substrate 4 in the display apparatus includes a windscreen.

For example, the windscreen may be a front windscreen, a side windscreen, or a rear windscreen.

In an exemplary embodiment, the display unit in the display apparatus may be located in an area below a steering wheel of the driving apparatus, worn on a head of the user, or provided in other positions of a cockpit, which may be specifically adjusted according to actual situations.

In the driving apparatus according to the embodiment of the present disclosure, as much display light as possible may be reflected to the human eye through joint action of the first imaging unit 3 and the second imaging unit 5. On one hand, light utilization rate of the head-up display system is improved and energy consumption is reduced. On the other hand, brightness of the displayed image projected on the light-transmitting substrate 4 and the display effect are improved, which further facilitates watching of the user. On the other hand, with the brightness of the displayed image projected on the light-transmitting substrate 4 being improved, contrast between the displayed image on the light-transmitting substrate 4 and the scene of the external environment may be improved, and thus the problem that content of the displayed image and the scene of the external environment are fused together and are difficult to be identified may be avoided.

The above is only specific embodiments of the present disclosure, but a protection scope of the present disclosure is not limited to this, and any change or substitution which occurs to any person familiar with this technical field within the technical scope disclosed by the present disclosure should be encompassed within the protection scope of the present disclosure. Therefore, a protection scope of the present disclosure shall be subject to a protection scope of the claims.

The invention claimed is:

1. A head-up display system, comprising:
   a display unit;
   a light splitting unit provided on a light emitting side of the display unit and configured to transmit a first linearly polarized light and block a second linearly polarized light, light emitted by the display unit being converted into the first linearly polarized light after passing through the light splitting unit;
   a light-transmitting substrate;
   a first imaging unit provided on an optical path from the light splitting unit to the light-transmitting substrate and configured to be capable of transmitting and reflecting the first linearly polarized light; and
   a second imaging unit provided on a side of the light-transmitting substrate away from the first imaging unit, and configured to reflect the first linearly polarized light transmitted through the light-transmitting substrate;
   wherein the second imaging unit comprises a second reflective polarizer and a phase retarder, the second reflective polarizer being disposed on a side of the light-transmitting substrate away from the first imaging unit, and the phase retarder being disposed between the light-transmitting substrate and the second reflective polarizer; wherein
   the phase retarder is configured to convert the first linearly polarized light into the second linearly polarized light on an optical path from the light-transmitting substrate to the second reflective polarizer; and to convert the second linearly polarized light into the first linearly polarized light on an optical path from the second reflective polarizer to the light-transmitting substrate; and
   the second reflective polarizer is configured to reflect the second linearly polarized light emitted from the phase retarder.

2. The head-up display system according to claim 1, wherein the first imaging unit comprises a transflective film provided on an optical path from the light splitting unit to the light-transmitting substrate, the transflective film being configured to reflect part of the first linearly polarized light and transmit a remaining part of the first linearly polarized light.

3. The head-up display system according to claim 1, wherein the second imaging unit comprises a first reflective polarizer disposed on a side of the light-transmitting substrate away from the first imaging unit and configured to reflect the first linearly polarized light transmitted through the light-transmitting substrate.

4. The head-up display system according to claim 1, wherein the phase retarder comprises a half-wave plate.

5. The head-up display system according to claim 1, wherein the phase retarder comprises a half-wave plate and a phase retardation compensation film.

6. The head-up display system according to claim 1, wherein the light-transmitting substrate comprises an interlayer; wherein
the interlayer is configured to be capable of changing a propagation path of lights from a first surface of the light-transmitting substrate to a second surface of the light-transmitting substrate so as to reduce reflection of the second surface, and further changing a propagation path from the second surface to the first surface to cause reflected lights of the first imaging unit and reflected lights of the second imaging unit to be radiated into a human eye along a same path; and
the first surface is a surface of the light-transmitting substrate away from the second imaging unit, and the second surface is a surface of the light-transmitting substrate away from the first imaging unit.

7. The head-up display system according to claim 6, wherein a cross-sectional shape of the interlayer in a direction perpendicular to the light-transmitting substrate comprises a wedge shape.

8. The head-up display system according to claim 1, wherein the head-up display system further comprises a light-transmitting protective film, the light-transmitting protective film being located on a side of the second imaging unit away from the light-transmitting substrate.

9. The head-up display system according to claim 1, wherein the first linearly polarized light is a P polarized light and the second linearly polarized light is an S polarized light; or, the first linearly polarized light is the S polarized light, and the second linearly polarized light is the P polarized light.

10. The head-up display system according to claim 9, wherein the display unit comprises one of an organic light emitting diode display screen, a micro display screen, a liquid crystal display screen, a digital light processing display screen and an LCOS display screen.

11. A head-up display system, comprising:
a display unit;
a light splitting unit provided on a light emitting side of the display unit and configured to transmit a first linearly polarized light and block a second linearly polarized light, light emitted by the display unit being converted into the first linearly polarized light after passing through the light splitting unit;
a light-transmitting substrate;
a first imaging unit provided on an optical path from the light splitting unit to the light-transmitting substrate and configured to be capable of transmitting and reflecting the first linearly polarized light; and
a second imaging unit provided on a side of the light-transmitting substrate away from the first imaging unit, and configured to reflect the first linearly polarized light transmitted through the light-transmitting substrate;
wherein the second imaging unit is further configured to convert ambient light into the second linearly polarized light in an optical path direction from the ambient light to the light-transmitting substrate;
wherein the second imaging unit comprises a second reflective polarizer and a phase retarder, the second reflective polarizer being further configured to convert the ambient light into the first linearly polarized light and the phase retarder being further configured to convert the first linearly polarized light into the second linearly polarized light.

12. A display apparatus comprising a head-up display system, wherein the system comprises:
a display unit;
a light splitting unit provided on a light emitting side of the display unit and configured to transmit a first linearly polarized light and block a second linearly polarized light, light emitted by the display unit being converted into the first linearly polarized light after passing through the light splitting unit;
a light-transmitting substrate;
a first imaging unit provided on an optical path from the light splitting unit to the light-transmitting substrate and configured to be capable of transmitting and reflecting the first linearly polarized light; and
a second imaging unit provided on a side of the light-transmitting substrate away from the first imaging unit, and configured to reflect the first linearly polarized light transmitted through the light-transmitting substrate;
wherein the second imaging unit comprises a second reflective polarizer and a phase retarder, the second reflective polarizer being disposed on a side of the light-transmitting substrate away from the first imaging unit, and the phase retarder being disposed between the light-transmitting substrate and the second reflective polarizer; wherein
the phase retarder is configured to convert the first linearly polarized light into the second linearly polarized light on an optical path from the light-transmitting substrate to the second reflective polarizer; and to convert the second linearly polarized light into the first linearly polarized light on an optical path from the second reflective polarizer to the light-transmitting substrate; and
the second reflective polarizer is configured to reflect the second linearly polarized light emitted from the phase retarder.

13. A driving apparatus comprising the display apparatus according to claim 12.

14. The driving apparatus according to claim 13, wherein the light-transmitting substrate in the display apparatus comprises a windscreen.

15. The display apparatus according to claim 13, wherein the second imaging unit comprises a first reflective polarizer disposed on a side of the light-transmitting substrate away from the first imaging unit and configured to reflect the first linearly polarized light transmitted through the light-transmitting substrate.

16. The display apparatus according to claim 12, wherein the first imaging unit comprises a transflective film provided on an optical path from the light splitting unit to the light-transmitting substrate, the transflective film being configured to reflect part of the first linearly polarized light and transmit a remaining part of the first linearly polarized light.

17. The display apparatus according to claim 12, wherein the second imaging unit comprises a first reflective polarizer disposed on a side of the light-transmitting substrate away from the first imaging unit and configured to reflect the first linearly polarized light transmitted through the light-transmitting substrate.

\* \* \* \* \*